United States Patent [19]

Hartig et al.

[11] Patent Number: 5,584,902

[45] Date of Patent: Dec. 17, 1996

[54] METHOD OF CONVERTING COATED GLASS

[75] Inventors: Klaus W. Hartig, Brighton; Philip J. Lingle, Temperance, both of Mich.

[73] Assignee: Guardian Industries Corp., Auburn Hills, Mich.

[21] Appl. No.: 359,599

[22] Filed: Dec. 20, 1994

Related U.S. Application Data

[62] Division of Ser. No. 131,696, Oct. 5, 1993, Pat. No. 5,376,455.

[51] Int. Cl.$^6$ ............................................. C03C 17/36
[52] U.S. Cl. .................... 65/32.4; 65/60.2; 65/106; 65/114; 204/192.26
[58] Field of Search ............................ 65/32.4, 60.2, 65/60.4, 60.8, 106, 107, 111, 114, 115, 116, 273; 204/192.22, 192.23, 192.26, 192.27, 192.28, 192.29

[56] References Cited

U.S. PATENT DOCUMENTS

| | | | |
|---|---|---|---|
| 3,272,986 | 9/1966 | Schmidt | 250/86 |
| 3,649,359 | 3/1972 | Apfel et al. | 117/33.3 |
| 3,681,042 | 8/1972 | Edwards et al. | 65/60 |
| 3,682,528 | 8/1972 | Apfel et al. | 350/1 |
| 3,698,946 | 10/1972 | Kaspaul et al. | 427/255 X |
| 3,781,089 | 12/1973 | Fay et al. | 350/164 |
| 3,798,146 | 3/1974 | Wan et al. | 204/192 |
| 3,826,728 | 7/1974 | Chambers et al. | 204/192 |
| 3,846,152 | 11/1974 | Franz | 117/33.3 |
| 3,889,026 | 6/1975 | Groth | 428/34 |
| 3,900,673 | 8/1975 | Mattimoe et al. | 428/339 |
| 3,901,997 | 8/1975 | Groth | 428/428 |

(List continued on next page.)

FOREIGN PATENT DOCUMENTS

| | | |
|---|---|---|
| 031278 | 12/1980 | European Pat. Off. |
| 0080182 | 6/1983 | European Pat. Off. |
| 2027233 | 2/1980 | United Kingdom . |
| WO9005439 | 5/1990 | WIPO . |

OTHER PUBLICATIONS

Airco, Coating Technology Symposium (date unknown,- admitted prior art).
Knihl, Zdenek "Optics of Thin Films" John Wiley & Sons Ltd. London, 1976, p. 284 only.
Airco Coating Technology, Super–E IV, pp. 1–23 (Redacted and Unredacted form in sealed envelope) date unknown admitted prior art.
Grubb et al. "Production Tech. for High Volume Sputtered Films" SPIE vol. 325 Optical Thin Films (1982) pp. 74–81.
Munz et al. "Performance and Sputtering Criteria of Modern Architectural Glass Coatings" SPIE vol. 325 Optical Thin Films (1982) pp. 65–73.
Airco Coating Technology, Super–E III, Jan. 1991, pp. 1–22 (Redacted Form).

*Primary Examiner*—Donald E. Czaja
*Assistant Examiner*—Sean Vincent
*Attorney, Agent, or Firm*—Myers, Liniak & Berenato

[57] ABSTRACT

A high performance, durable sputter coated, heat-treatable glass which after heat-treatment exhibits about 76% or more visible transmittance, a hemispherical emissivity ($E_h$) of about 0.16 or less, and a normal emissivity ($E_n$) of about 0.12 or less is formed by sputter coating a layer system on a glass substrate which includes an undercoat and overcoat of $Si_3N_4$, a silver layer, and two nickel or nichrome layers on opposite sides of the silver layer, and wherein the lower nickel-based layer is about three times as thick as the other nickel based layer. The increased thickness of the lower nickel-based layer allows the coated glass article to be both heat-treatable, and "low-E" after the heat-treatment. This allows matching with other known glasses in the family of layer components by way of the heat-treatment process. The layer system employed allows, even if not matchable to another glass, for the sputter coating operation to include the coating of other members of the family of coating without change of targets, efficient use of the coater targets that exist, and minimal operational changes during production.

10 Claims, 1 Drawing Sheet

U.S. PATENT DOCUMENTS

| | | | |
|---|---|---|---|
| 3,935,351 | 1/1976 | Franz | 428/34 |
| 3,962,488 | 6/1976 | Gillery | 427/109 |
| 3,978,273 | 8/1976 | Groth | 428/434 |
| 3,990,784 | 11/1976 | Gelber | 117/71 |
| 4,022,947 | 5/1977 | Grubb et al. | 428/432 |
| 4,166,018 | 8/1979 | Chapin | 204/192 |
| 4,170,460 | 10/1979 | Donley | 65/30 |
| 4,179,181 | 12/1979 | Chang | 350/1.7 |
| 4,204,942 | 5/1980 | Chahroudi | 204/298 |
| 4,335,166 | 6/1982 | Lizardo et al. | 428/34 |
| 4,337,990 | 7/1982 | Fan et al. | 350/1.7 |
| 4,356,073 | 10/1982 | McKelvey | 204/192 |
| 4,413,877 | 11/1983 | Suzuki et al. | 350/1.7 |
| 4,414,254 | 11/1983 | Iwata et al. | 428/34 |
| 4,422,916 | 12/1983 | McKelvey | 204/192 |
| 4,462,883 | 7/1984 | Hart | 204/192 |
| 4,488,775 | 12/1984 | Yamamoto | 350/164 |
| 4,497,700 | 2/1985 | Groth et al. | 204/192 |
| 4,512,863 | 4/1985 | Criss et al. | 204/192 |
| 4,537,798 | 8/1985 | Cohen | 427/166 |
| 4,548,691 | 10/1985 | Dietrich et al. | 204/192 |
| 4,556,277 | 12/1985 | Fan et al. | 350/1.7 |
| 4,563,400 | 1/1986 | Criss et al. | 428/630 |
| 4,594,137 | 6/1986 | Gillery et al. | 204/192 |
| 4,639,069 | 1/1987 | Yatabe et al. | 350/1.7 |
| 4,680,742 | 7/1987 | Yamada et al. | 369/13 |
| 4,692,389 | 9/1987 | Gillery et al. | 428/622 |
| 4,710,426 | 12/1987 | Stephens | 428/336 |
| 4,715,879 | 12/1987 | Schmitte et al. | 65/60.2 |
| 4,716,086 | 12/1987 | Gillery et al. | 428/630 |
| 4,769,291 | 9/1988 | Belkind et al. | 428/630 |
| 4,780,372 | 10/1988 | Tracy et al. | 428/428 |
| 4,786,784 | 11/1988 | Nikodeu et al. | 219/543 |
| 4,790,922 | 12/1988 | Huffer | 204/192.27 |
| 4,799,745 | 1/1989 | Meyer et al. | 350/1.7 |
| 4,806,220 | 2/1989 | Finley | 204/192 |
| 4,816,054 | 3/1989 | Schmitte | 65/106 |
| 4,826,525 | 5/1989 | Chesworth | 65/60.2 |
| 4,847,158 | 7/1989 | Gillery | 428/433 |
| 4,857,094 | 8/1989 | Groth et al. | 65/60.2 |
| 4,943,484 | 7/1990 | Goodman | 428/441 |
| 4,948,482 | 8/1990 | Kobayashi | 204/192.23 |
| 4,954,232 | 9/1990 | Yamada et al. | 204/192.23 |
| 5,062,937 | 11/1991 | Komuro | 204/192.15 |
| 5,188,887 | 2/1993 | Lingle et al. | 428/216 |
| 5,201,926 | 4/1993 | Szczyrbowski et al. | 65/60.2 |
| 5,229,194 | 7/1993 | Lingle et al. | 428/216 |
| 5,242,560 | 9/1993 | Lingle et al. | 204/192 |
| 5,377,045 | 12/1994 | Wolfe et al. | 359/585 |

METHOD OF CONVERTING COATED GLASS

This is a division of application Ser. No. 08/131,696 filed Oct. 5, 1993 now U.S. Pat. No. 5,376,455.

FIELD OF THE INVENTION

This invention relates to sputter coated glasses and methods for making them. More particularly, this invention relates to sputter coated glasses which are heat-treatable and exhibit high visible light transmittance and excellent infrared energy reflecting characteristics useful as architectural glasses, and certain unique methods for making them.

BACKGROUND OF THE INVENTION

For architectural flat glass, such as is made by the "float" process, two of the more prominent techniques for creating solar management coatings on these glasses are the pyrolytic process and the magnetron sputter coating process. Drawbacks heretofore experienced in the sputter coating process have been that the coatings can often be easily rubbed off (i.e. lack durability) and that the polysealant used in forming multi-paned architectural windows often attacks the coating. This, in turn, breaks down the seal between the panes, allowing detrimental condensation to accumulate between them. On the other hand, sputter coatings have had the historic advantage of being able to achieve low emissivity values and high visible light transmittance properties, as compared to most pyrolytic coatings. These latter two properties are perhaps among the most important to achieve in certain architectural glasses.

The terms "emissivity" and "transmittance" are well understood in the art and are used herein according to their well known meaning. Thus, for example, the term "transmittance" herein means solar transmittance, which is made up of visible light transmittance, infrared energy transmittance, and ultraviolet light transmittance. Total solar energy transmittance is then usually characterized as a weighted average of these other values. With respect to these transmittances, visible transmittance, as reported herein, is characterized by the standard Illuminant C (10° obs., unless otherwise specified) technique at 380–720 nm; infrared is 800–2100 nm; ultraviolet 300–400 nm; and total solar is 300–2100 nm. For purposes of emissivity, however, a particular infrared range (i.e. 2,500–40,000 nm) is employed, as discussed below.

Visible transmittance can be measured using known, conventional techniques. For example, by using a spectrophotometer, such as a Beckman 5240 (Beckman Sci. Inst. Corp.), a spectral curve of transmission at each wavelength is obtained. Visible transmission is then calculated using ASTM E-308 "Method for Computing the Colors of Objects by Using the CIE System" (*Annual Book of ASTM Standards*, Vol. 14.02). A lesser number of wavelength points may be employed than prescribed, if desired. Another technique for measuring visible transmittance is to employ a spectrometer such as a commercially available Spectragard spectrophotometer manufactured by Pacific Scientific Corporation. This device measures and reports visible transmittance directly.

"Emissivity" (E) is a measure, or characteristic of both absorption and reflectance of light at given wavelengths. It is usually represented by the formula:

$$E = 1 - \text{Reflectance}_{film}$$

For architectural purposes, emissivity values become quite important in the so-called "mid range", sometimes also called the "far range", of the infrared spectrum, i.e. about 2,500–40,000 nm The term "emissivity" as used herein, is thus used to refer to emissivity values measured in this infrared range as specified by the 1991 Proposed ASTM Standard for measuring infrared energy to calculate emittance, as proposed by the Primary Glass Manufacturers' Council and entitled "Test Method for Measuring and Calculating Emittance of Architectural Flat Glass Products Using Radiometric Measurements". This Standard, and its provisions, are incorporated herein by reference. In this Standard, hemispherical emissivity ($F_n$) can be broken down into components, one of which is its normal emissivity ($E_n$) component.

The actual accumulation of data for measurement of such emissivity values is conventional and may be done by using, for example, a Beckman Model 4260 spectrophotometer with "VW" attachment (Beckman Scientific Inst. Corp.). This spectrophotometer measures reflectance versus wavelength (i.e. normal emittance, $E_n$), and from this, hemispherical emissivity ($E_h$) is calculated using the aforesaid 1991 Proposed ASTM Standard which has been incorporated herein by reference.

Another term employed herein is "sheet resistance". Sheet resistance ($R_s$) is a well known term in the art and is used herein in accordance with its well known meaning. Generally speaking, this term refers to the resistance in ohms for any square of a layer system on a glass substrate to an electric current passed through the layer system. Sheet resistance is an indication of how well the layer is reflecting infrared energy, and is thus often used along with emissivity as a measure of this characteristic, so important in many architectural glasses. "Sheet resistance" is conveniently measured by using a 4-point probe ohmmeter, such as a 4-point resistivity probe with a Magnetron Instruments Corp. head, Model M-800 produced by Signatone Corp. of Santa Clara, Calif.

As stated above, for many architectural purposes it is desirable to have as low an emissivity and $R_s$ as feasible, such that the glass window is reflecting substantial amounts of the infrared energy impinging on the glass. Generally speaking, "low E" (i.e. low emissivity) glasses are considered to be those glasses which have a hemispherical emissivity ($E_h$) of less than about 0.16 and a normal emissivity ($E_n$) of less than about 0.12. At the same time, sheet resistance ($R_s$) is, therefore, preferably less than about 12 ohms/sq. Such glasses, to be commercially acceptable, usually are required to transmit as much visible light as possible, often about 76% or more using the Illuminant C technique for measuring transmittance in glasses of about 2 mm–6 mm thick.

"Chemical resistance" herein is determined by boiling a 2"×5" sample of the article in about 500 cc of 5% HCl for one hour (i.e. about 220° F.). The article is deemed to pass this test if it shows no pinholes greater than about 0,003" in diameter after this one hour boil.

"Durability" is herein measured by one of two tests, first a conventional Taber abrader test using a 4"×4" sample and a 500 g weight attached to each of two C.S. 10F. abrasion wheels rotated through 100–300 revolutions. Durability may also be tested using a Pacific Scientific Abrasion Tester (1"nylon brush cyclically passed over the coating in 500 cycles employing 150 gms. of weight, applied to a 6"×17"sample). In both tests, if no substantially noticeable scratches appear when viewed with the naked eye under visible light, the test is deemed passed, and the article is said to be durable. A less subjective evaluation may be made by measuring the change in visible transmission between the unabraded portion of the sample with the abraded portion and placing a numerical value (e.g. percent reduction) on any decrease in the transmission. By placing a numerical limit on the decrease, a "pass" or "fail" mark can be established (e.g. "more than 20%" would be one limit that might be set).

The term "heat-treatable" is used in this invention differently than in our former patents and applications in the following respect. In both this invention and our former patents, etc. the term assumed (and still assumes) that an acceptable product by way of uniformity (as well as chemical and mechanical durability in preferred embodiments) is achieved after heat-treatment. In our former patents, etc., it was also desired in their preferred embodiments that the solar management properties (including color) not be materially changed during heat-treatment. In this invention, on the other hand, the term "heat-treatable" does not necessarily include such a restriction, since in some embodiments it may well be desirable that the solar management properties change significantly in order to match the characteristics of another (e.g. unheat-treated) product with which it is to be matched. In this invention, however, the ultimate solar management properties are to be those predetermined and desired. Of course, the heat-treatment must also not adversely affect, to any substantial extent, the uniformity (and/or mechanical and chemical durability characteristics in preferred embodiments) of the product before heat-treatment (except to the extent that the heat-treatment may improve such characteristics).

The technique of creating architectural glass by magnetron sputter coating multiple layers of metals and/or metal oxides or nitrides onto float glass sheets is well known and a large number of permutations and combinations of known metals (e.g. Ag, Au, etc.), oxides and nitrides (including $Si_3N_4$) have been attempted and reported. Such techniques may employ either planar or tubular targets, or a combination of both, and multi-target zones to achieve their desired results. Exemplary of preferred apparatus for use in this invention, and known in the art, is a magnetron sputter coater sold by Airco Corporation. This commercially available device is disclosed in U.S. Pat. Nos. 4,356,073 and 4,422,916, respectively. The disclosures of these patents are incorporated herein by reference.

In particular, it has been known to use the aforesaid Airco sputter coater to produce architectural glasses having a layering system, sequentially from the glass (e.g. standard float glass) outwardly, as follows:

$Si_3N_4$/Ni:Cr/Ag/Ni:Cr/$Si_3N_4$ in which it has been found in practice that the Ni:Cr alloy is 80/20 by weight Ni/Cr, respectively (i.e. nichrome), and wherein the two nichrome layers are reported as being about 7 Å thick, the Ag layer is specified as being about 70 Å thick (except that it is stated that the silver may be about 100 Å thick), and the $Si_3N_4$ are relatively thicker (e.g. about 320 Å for the undercoat and about 450 Å for the overcoat). The two nichrome layers are adjusted together and therefore have substantially equal thicknesses. It is known in this respect to adjust the thicknesses of these nichrome layers together to improve adhesion by adjusting the relevant parameters in the coater during setup.

FIG. 1 schematically illustrates a typical Airco sputter coater as referenced above, used to produce this known Airco product which is illustrated in FIG. 2. With reference to FIG. 1, Zones 1, 2, 4, and 5 are made up of silicon (Si) tubular targets ($t_{1-12}$ and $t_{19-30}$) and sputtering is conducted in a 100% $N_2$ atmosphere. Zone 3 typically employs planar targets "P" and is used to create the three intermediate layers, i.e. Ni:Cr/Ag/Ni:Cr. A 100% argon atmosphere is employed in Zone 3.

While this glass coating achieved good mechanical durability and chemical resistance (i.e. the coating was scratch resistant, wear resistant and chemically stable) and thus achieved an important measure of this characteristic as compared to pyrolytic coatings, its other characteristics in practice, have been found to fall short of the levels of infrared reflectance and visible transmittance characteristics normally desired for low-E architectural glasses. For example, for glass at least 3 mm thick, visible transmittance (Ill. C 10° obs.) for the product shown in FIG. 2 is usually only about 76%, $E_n$ is about 0.20–0.22, and $E_h$ is about 0.14–0.17. Both of these emissivity values are rather high. In addition, sheet resistance ($R_s$) measures a relatively high 15.8 ohms/sq. (the more acceptable value being less than about 12.0).

Furthermore, this glass of FIG. 2 proved to be non-heat-treatable, so that it could not be bent, tempered, or heat strengthened without adversely affecting the coating or substrate. This is because when subjected to heat-treatment the silver layer becomes discontinuous and voids develop. The result is that emissivity goes up greatly because the silver layer becomes non-uniform; the chemical resistance is very bad; and transmittance goes up greatly.

Thus, while durability was significantly improved and while these coatings also proved to be compatible with conventional sealants, solar management qualities and heat-treatability were less than optimal for many modern architectural purposes.

Using, then, the apparatus and atmosphere of FIG. 1 and by controlling speed and electrical power to the sputtering operation, accordingly, the known Airco process produced a layered system such as that illustrated in prior art FIG. 2. In this FIG. 2, there is shown a glass substrate "G". Such a glass substrate was preferably a sheet of glass of about 2 mm–6 mm thick, usually made by the known float process and of a typical soda-lime-silica composition employed historically in this process. In Zones 1–2, a first undercoat layer 1 consisting essentially of $Si_3N_4$ was formed. Its nominal thickness was about 325 Å. Zones 1–2 were conducted in substantially 100% $N_2$. Next, Zone 3 was employed using a substantially 100% argon atmosphere to first produce a relatively thick (e.g. 7 Å) layer 3 of 80/20 nichrome, followed by a rather discontinuous silver layer 5 whose discontinuity is illustrated by voids 7. In this same Zone 3, there was then applied to the silver another, equally thick (e.g. 7 Å) 80/20 nichrome layer 9. Both nichrome layers were of substantially the same thickness. A topcoat 11 of $Si_3N_4$ was then applied in Zones 4–5 with a thickness somewhat greater than that of undercoat 1 due to increased power (e.g. about 450 Å thick). The less than desirable solar management qualities of this glass are mentioned above.

In addition to this Airco layer system illustrated in FIG. 2, other coatings containing silver and/or Ni:Cr as layers for infrared reflectance and other light management purposes have been reported in patent and scientific literature. See, for example, the Fabry-Perot filters and other prior art coatings and techniques disclosed in U.S. Pat. Nos. 3,682,528 and 4,799,745 (and the prior art discussed and/or cited therein). See also the dielectric, metal sandwiches created in numerous patents including, for example, U.S. Pat. Nos. 4,179, 181; 3,698,946; 3,978,273; 3,901,997; and 3,889,026 just to name a few. While such other coatings have been known or reported, it is believed that prior to the present invention, none of these prior art disclosures taught or have achieved the ability to employ the highly productive sputter coating process and, at the same time, achieve a glass which not only approaches or equals the durability of pyrolytic coatings, but which also achieves excellent solar management qualities as well.

The popularity of metal and metal oxide coated glasses in architectural and automotive design is also well known. As reported prolifically in patent and other literature, such glasses, usually achieve, through the manipulation of the coating's layering system, fairly acceptable degrees of reflectance, transmittance, emissivity, chemical resistance, and durability, as well as the color desired. See, for example, in this respect, U.S. Pat. Nos. 3,935,351; 4,413,877; 4,462,883; 3,826,728; 3,681,042; 3,798,146; and 4,594,137 just to name a few.

Another Airco prior art coated glass, Airco "Aircool 72 or 76", consists essentially of the following layers from a glass substrate outward: $SnO_2$/Al/Ag/Al/$SnO_2$. While being heat-treatable, these coated glasses are rather soft and lack durability.

In recent years, the popularity of coated glasses has occasioned numerous attempts to achieve a coated glass article which, prior to heat-treatment, can be coated, and which thereafter, can be heat-treated without adversely changing the characteristics of the coating or the glass itself (i.e. the resulting glass article).

One of the reasons for this is, for example, that it can be extremely difficult to achieve a uniform coating on an already bent piece of glass. It is well known that if a flat glass surface can be coated and thereafter bent, much simpler techniques can be used to get a uniform coating than if the glass has been previously bent. This is true for architectural, automotive, and residential glasses.

Certain techniques have been developed in the past for making coated heat-treatable glass articles which may then, and thereafter, be heat-treated by way of tempering, bending, or a technique known as "heat strengthening". Generally speaking, many of these prior coated articles (such as the article of FIG. 2) have suffered from not being heat-treatable at the higher, elevated temperatures necessary to achieve economic bending, tempering and/or heat strengthening (i.e. 1150° F.–1450° F.). In short, such techniques have suffered from a need to keep the temperature at approximately 1100° F. or less in order to achieve heat-treatability without adversely affecting the coating or its substrate. This latter situation; namely the absence of any substantial adverse affect upon the coating or its substrate, herein is ultimately what is meant, then, and in coordinance with the definition given above, by the term "heat-treatable" as used herein.

In this respect, U.S. Pat. No. 5,188,887 discloses certain prior art coating systems which are heat-treatable as that term is defined in this patent because they can be heat-treated successfully at the higher, more elevated temperatures aforesaid, to achieve the desired result despite having gone through tempering, bending or heat strengthening. Generally speaking, these prior art coating compositions find their uniqueness in a layering system which employs as a metallic layer, a high nickel content alloy which, in its preferred form, is an alloy known as Haynes 214, consisting essentially of 75.45% Ni, 4.00% Fe, 16.00% Cr, 0.04% C, 4.50% Al, and 0.01% Y (percentages are by weight). By using a high nickel content alloy, such as Haynes 214, and overcoating it with stoichiometric tin oxide ($SnO_2$) either alone or with other layers (such as an undercoat of the same stoichiometric tin oxide and/or an intermediate layer of aluminum between the top $SnO_2$ layer and the high content nickel alloy), it was found that heat-treatability of glass articles at elevated temperatures of from approximately 1150° F.–1450° F. from about 2–30 minutes, could be achieved without substantial degradation of color, mechanical durability, emissivity, reflectance or transmittance. These compositions therefore constituted a significant improvement over prior heat-treatable systems such as those disclosed in the following U.S. Pat. Nos. 4,790,922; 4,816,034; 4,826,525; 4,715,879; and 4,857,094.

In addition to the above disclosures in the aforesaid patents, the Leybold windshield glass system TCC-2000 is also known. This system is generally disclosed in U.S. Pat. No. 5,201,926. In this system, four or five layers of metals and metal oxides are employed to obtain a sputter coated glass which, being somewhat heat-treatable at temperatures up to 1100° F. may be used as a pre-coated glass for making bent or unbent, glass windshields, provided that rapid time limits are placed on the heat-treatment. The layering from glass substrate outward usually includes a first layer of tin oxide, a second layer of nickel/chrome alloy (usually about 80/20), a third layer of silver, a fourth layer of the nickel/chrome alloy, and a fifth layer of tin oxide. In addition to the rather low upper limit on heat-treatment temperature and times, the resultant coatings are rather soft and exhibit such unacceptably low chemical resistance characteristics that they can realistically be used only on the inner surfaces of laminated glass windshields because of their lack of durability. U.S. Pat. No. 5,201,926 further discloses that the upper and/or lower layers in this system may be, in addition to tin oxide, silicon dioxide, aluminum oxide, tantalum oxide, zirconium oxide or mixtures thereof. This patent also states that the silver layer may be silver or a silver alloy of at least 50% by weight silver. The layer thicknesses reported are, respectively (from glass outwardly) 35 nm, 2 nm, 20 nm 2 nm and 35 nm.

In U.S. Pat. No. 5,229,194, which is prior art to the subject invention due to commercial sale more than one year prior to our filing date herein, a significant advance in the heat-treatable sputter coatings is disclosed, even when compared to those disclosed in U.S. Pat. No. 5,188,887. In that invention it was found that unique results in the area of heat-treatable (as that term is defined therein) sputter coated glasses were achievable, particularly when used as "privacy" windows in vehicles, if metallic nickel or a high content metallic nickel alloy layer were surrounded by an undercoat and overcoat of a separate layer of an oxide or nitride of nickel or high content nickel alloy, and a further overcoat of an oxide such as $SnO_2$, ZnO, $TiO_2$ or oxide alloys thereof was employed. Silicon is also mentioned as useful for the first overcoat of the metallic nickel-containing layer. The content of the aforesaid U.S. Pat. No. 5,229,194 is hereby incorporated herein by reference.

The above-mentioned layering systems disclosed by U.S. Pat. No. 5,229,194, proved particularly heat-treatable and abrasion resistant. However, while some were found initially to be chemically resistant, certain systems when put into mass production were found not to pass the rather rigorous one hour 5% HCl boil chemical resistance test (discussed above). Their infrared and UV reflectance characteristics were, however, found to be excellent for a wide range of uses. Still further, however, their visible light transmittance values, desirably low for "privacy" window use, nevertheless proved to be too low to be truly useful as glass windows or panels for architectural or residential purposes where high visible light transmittance is required. Thus when production called for the sputter coater to fulfill orders for architectural or residential coated glass after glass sheets for "privacy" windows had been coated, the coater had to be shut down so that a new layering system could be formed. If such a shutdown could be avoided a significant economic advance would be accomplished.

In our commonly owned, co-pending application Ser. No. 07/876,350 filed Apr. 30, 1992, entitled "High Performance, Durable, Low-E Glass and Method of Making Same", there are disclosed certain unique sputter coated layering systems having unique applicability for architectural and residential purposes because of their achievement of not only good chemical and mechanical durability, but their solar management properties as well. These systems are properly deemed "low-E" glasses (coatings) because their hemispherical emissivity ($E_h$) was generally less than about 0.16 and their normal emissivity ($E_n$) was generally less than about 0.12. Measured another way their sheet resistance was preferably less than about 10.50 ohms/square. In addition, for normal glass thicknesses (e.g. 2 mm–6 mm) visible light transmittance was preferably about 78% or more (compared to less than about 22–23% in certain preferred embodiments of the aforesaid heat-treatable "privacy" window layer systems of U.S. Pat. No. 5,229,194).

The invention in this aforesaid co-pending application Ser. No. 07/876,350, hereby incorporated herein by reference, achieved its unique low-E, high visible light transmittance values (T>78%, En<0.12, etc.), along with its good chemical durability (passed the rigorous 5% HCl boil test) and resistance to abrasion, by employing a layer system which, in a first five-layered embodiment, generally comprised (from a glass substrate outwardly) an undercoat layer of $Si_3N_4$, a first layer of nickel or nickel alloy (e.g. nichrome), a layer of silver, a second layer of nickel or nickel alloy, and an overcoat layer of $Si_3N_4$. In certain other preferred embodiments, the layer system from the glass substrate outwardly consisted essentially of: $Si_3N_4$/Ni:Cr/Ag/Ni:Cr/Ag/Ni:Cr/$Si_3N_4$. This seven layer system was found to exhibit somewhat higher durability and scratch resistance characteristics than the above-described five layer system. In each system, however, the preferred Ni:Cr layer was nichrome, i.e. 80/20 by weight Ni/Cr, and in which a substantial portion of the chromium formed as a nitride of Cr because the Ni:Cr layer was formed in a nitrogen-containing atmosphere.

Unfortunately, these durable, low-E, high visible transmittance glass layer systems proved to be non-heat-treatable. It is believed that this non-heat treatability is due to the metallic silver layer(s) during heat-treatment becoming discontinuous due to non-wetting, in this case because the Ni:Cr surrounding layers are insufficient to maintain the continuity of the silver layer(s) during heat-treatment. Thus these otherwise advantageous layer systems could not be used where the layered glass was thereafter to be heat-treated as by tempering, heat strengthening, and bending. Unfortunately, the silver layers were necessary to employ in order to achieve the desired low-E results.

It is to be remembered in this respect that certain architectural, residential, and automotive uses require the coated glass to be tempered, bent, or heat strengthened. Most notably, in architectural settings, the use of heat-treatable "temperable, etc." glasses in conjunction with the non-heat-treatable glass of the aforesaid mentioned Ser. No. 07/876, 350 is often required. Therefore, the need arises for production of a heat-treated glass which exhibits characteristics (color, emissivity, sheet resistance, etc.) substantially matching those of the non-heat-treated glass described in aforesaid-mentioned Ser. No. 07/876,350 so that both can be used together; for example in the same building; side-by-side.

In our commonly owned, co-pending application Ser. No. 08/102,281, filed Aug. 5, 1993, hereby incorporated herein by reference, an excellent, heat-treatable glass layering system is disclosed. Such a layering system generally includes multiple family layering systems each of which includes the use of sputter coating targets and atmospheres to form as constituent layers, layers of $Si_3N_4$ and Ni/Cr and/or oxides thereof. The coated glass articles described in Ser. No. 08/102,281 after heat-treatment are excellent, but they do not exhibit optical characteristics (color, emissivity, reflectance, etc.) substantially similar or substantially matching those of the unheat-treatable glass described in aforementioned Ser. No. 07/876,350. Nevertheless, and even though it does not meet the need for a system which after heat-treatment substantially matches another glass in unheat-treated form, it can be produced because of its commonality in layers with a minimal change to the sputter coating operation along with the glasses of this invention herein, as well as those of the 876,350 type. This is a significant characteristic and finding of our current invention.

Indeed, an important finding and thus significant aspect of our invention herein, as more fully described below, is the fulfillment of a long felt need to be able to produce with minimal adjustment of the sputter coating operation a flexible range of sputter coating products each being somewhat different and thereby serving to fulfill the varying needs of a diverse range of customers. For example, and as further explained below, in a typical 30 target, Airco sputter coater employing silicon, Ni/Cr, and Ag targets, the subject invention envisions the ability to produce in a single run with simple adjustment to the sputter coater parameters, products for the automotive industry (e.g. coated glass sheet later bent into windshields, etc.) as disclosed in Ser. No. 08/102,281, products for the architectural (building) industry which are untempered as disclosed in Ser. No. 876,350 and products for the architectural (building) and automotive industries which are temperable and bendable, and which optically match those of the '350 type as disclosed by the subject invention.

It is therefore apparent that there exists a need in the art for a sputter coated glass layering system which, after being heat-treated (tempered, bent, etc.) has optical characteristics which substantially match or are substantially similar to those of the low-E non-heat-treatable coated glass of the aforesaid-mentioned co-pending Ser. No. 07/876,350, and preferably which can be manufactured in the same operation as these aforesaid, non-heat-treatable glasses, without shut down of the sputter coating operation. It is a purpose of this invention to fulfill this need in the art as well as other needs which will become apparent to the skilled artisan once given the following disclosure.

As used herein the term "$Si_3N_4$" means the formation of silicon nitride generally and not necessarily a precise stoichiometric silicon nitride — nor that the layer formed thereof consists entirely of just silicon nitride, since in certain instances the targets employed may be doped with small amounts of such elements as aluminum which then show up in the layer elements or their own nitrides. Thus, the term "$Si_3N_4$" is used herein as a short-hand to designate a layer which consists essentially of the nitride(s) of silicon.

The term "nichrome" in like manner is used herein, in its generic sense to designate a layer which includes some combination of nickel and chromium, at least some of which is in its metallic state, although same may be oxidized. In a similar way the term "silver" means that the layer consists essentially of metallic silver, but may include some other elements in small concentrations that do not adversely affect the performance characteristics of the silver in the system as a whole.

SUMMARY OF THE INVENTION

Generally speaking this invention fulfills the above-described needs in the art by providing a heat-treatable coated glass article having a sputter coated layer system thereon which comprises from the glass outwardly: (a) a first layer of $Si_3N_4$ having a thickness of about 350–450 Å; (b) a first layer of nickel or nichrome having a thickness of greater than about 20 Å; (c) a layer of silver having a thickness of about 50–120 Å; (d) a second layer of nickel or nichrome having a thickness of at least about 7 Å; and (e) a second layer of $Si_3N_4$ having a thickness of about 450–550 Å; and wherein the coated glass article when the glass is clear glass and has a thickness of about 2.5–3.5 mm, has the following characteristics after heat-treatment:

| | |
|---|---|
| Transmittance (Ill. C 10° obs.) | about 76–78% |
| Sheet resistance ($R_s$) | less than about 12 ohms/sq. |
| Emissivity, normal ($E_n$) | less than about 0.12 |
| Emissivity, hemispherical ($E_h$) | less than about 0.16. |

In preferred embodiments this glass article (product) exhibits "chemical resistance" and "durability" as defined above. In certain further preferred embodiments the layered glass substrate when clear has the following characteristics before heat-treatment:

| | |
|---|---|
| Transmittance (Ill. C 10° obs.) | about 70–73% |
| Sheet Resistance ($R_s$) | less than about 15.0 ohms/sq |
| Emissivity, normal ($E_n$) | less than about 0.16 |
| Emissivity, hemispherical ($E_h$) | less than about 0.20 |

In certain other preferred embodiments the normal emissivity ($E_n$) is about 0.15 or less (e.g. 0.14) before heat-treatment and about 0.11 or less (e.g. 0.10) after heat-treatment; the hemispherical emissivity ($E_h$) is less than about 0.18 (e.g. 0.17) before heat-treatment and less than about 0.14 (e.g. 0.13) after heat-treatment; and the thickness of the $Si_3N_4$ adjacent the substrate is about 375 Å and the thickness of the other layer of $Si_3N_4$ is about 500 Å. In certain further preferred embodiments of this invention the thickness of the first sputter coated nickel or nichrome layer is about three times as great as the thickness of the other nickel or nichrome layer and the first sputter coated nickel or nichrome layer is about 20–50 Å thick and the second sputter coated nickel or nichrome layer is about 7–15 Å thick. In certain further preferred embodiments of this invention, the sputter coated layer system consists essentially of the five above-described layers and the silver layer is about 75 Å thick.

This invention further fulfills the above-described needs in the art by providing a method of forming a heat-treated thin, durable, solar management layering system onto a glass substrate, the steps including: (a) sputter coating in a nitrogen-containing atmosphere an undercoat layer of $Si_3N_4$; (b) sputter coating in an inert gas-containing atmosphere a first layer of nickel or nichrome, the first nickel or nichrome layer being at least about 20 Å thick; (c) sputter coating in an inert gas-containing atmosphere a layer of silver; (d) sputter coating in an inert gas-containing atmosphere a second layer of nickel or nichrome, the second layer of nickel or nichrome being about 7–15 Å thick; (e) sputter coating in a nitrogen containing atmosphere an overcoat layer of $Si_3N_4$; and thereafter heat-treating the coated glass; and wherein the heat-treated, sputter coated glass has the following characteristics after the heat-treatment when the glass substrate is clear glass and has a thickness of about 2.5–3.5 mm:

| | |
|---|---|
| Transmittance (Ill. C 10° obs.) | about 76–78% |
| Sheet resistance ($R_s$) | less then about 12 ohms/sq. |
| Emissivity, normal ($E_n$) | less than about 0.12 |
| Emissivity, hemispherical ($E_h$) | less than about 0.16. |

In certain preferred embodiments of this invention, the heat-treating is selected from tempering, bending, or heat strengthening. In certain further preferred embodiments of this invention the heat-treating step comprises tempering the coated glass by heating it to a temperature of about 1150° F.–1450° F. for at least five minutes and thereafter quenching it, the heating and quenching steps being for a sufficient period of time to temper the glass. In certain further preferred embodiments of this invention, the coated glass is heated to a temperature and for a sufficient period of time to render the glass article bendable, and thereafter bending the glass to a desired shape while in its bendable condition. In certain further preferred embodiments of this invention, the sputter coating is carried out in a plurality of zones isolated from one another and wherein the steps of forming the layers of $Si_3N_4$ by sputter coating are carried out in at least two separate zones, each having an atmosphere consisting essentially of about 80% nitrogen and about 20% argon, and wherein the steps of forming the nickel or nichrome layers and the silver layer are carried out in the same zone and wherein the sputter coating is conducted in the same zone in an atmosphere consisting essentially of one of: (a) substantially 100% argon; and (b) about 95% argon and about 5% oxygen.

This invention further fulfills the above described needs in the art by providing a process for sequentially producing at least two sputter coated glass articles which differ substantially from each other in at least one solar management characteristic, or in their ability and inability respectively to be heat-treatable, or in both, the sputter coating on each glass article comprising a plurality of sputter coated layers thereby to form a sputter coating system comprised of $Si_3N_4$ and a nickel/chrome component, the steps comprising:

a) providing a sputter coater having a plurality of targets within a plurality of atmospheric zones set up so as to produce a first layer system on a first glass article, wherein substantially all of the targets and zones are used to produce the first layer system;

b) sputter coating the first layer system onto the first glass article using the setup as provided in step a);

c) thereafter, changing the setup of step a) without adding to or substituting for any of the plurality of targets and without enlarging or decreasing the size of the atmospheric zones, to provide a setup so as to produce a second layer system on a second glass article whereby substantially all of the targets and zones are used to produce the second layer system; and d) thereafter, sputter coating the second layer system onto the second glass article using the setup as provided in step c).

In certain preferred embodiments of this invention the sputter coater includes about 30 targets or less and about 6 atmospheric zones or less. In certain further preferred embodiments of this invention, only one of the sputter coated glass articles is heat-treatable but after it is heated treated both of the sputter coated glass articles have substantially the same solar management characteristics as defined by visible transmittance, color, and emissivity. In certain further preferred embodiments of this invention, before the heat-treatable sputter coated glass article is heat-treated, it has substantially different solar management characteristics as defined by at least one of visible transmittance, color, or emissivity.

This invention further fulfills the above described needs in the art by providing a method of converting at least one solar management property of a heat-treatable, sputter coated glass article to a preselected level by heat-treating the coated glass article, the steps including:

a) producing a heat-treatable coated glass article by sputter coating on a glass substrate from the substrate outward a layer system comprising:
  (i) a first $Si_3N_4$ layer;
  (ii) a first nickel or nichrome layer;
  (iii) a silver layer;
  (iv) a second nickel or nichrome layer; and
  (v) a second $Si_3N_4$ layer.
b) heat-treating the coated glass article, thereby to significantly alter at least one solar management characteristic selected from visible transmittance, emissivity, or color; and wherein the resulting coated glass article after the heat-treatment and when the substrate is clear glass and is about 2.5 mm–3.5 mm thick has the following characteristics:

| | |
|---|---|
| Transmittance (Ill. C 10° obs.) | greater than about 76% |
| Sheet resistance ($R_s$) | less than about 12 ohms/sq. |
| Emissivity, normal ($E_n$) | less than about 0.12 |
| Emissivity, hemispherical ($E_h$) | less than about 0.16. |

In certain preferred embodiments of this invention, the sputter coated glass before heat-treatment has the following characteristics when the substrate is clear glass and has a thickness of about 2.5 mm–3.5 mm:

| | |
|---|---|
| Transmittance (Ill. C 10° obs.) | about 70–73% |
| Sheet resistance ($R_s$) | less than about 15.0 ohms/sq. |
| Emissivity, normal ($E_n$) | less than about 0.16 |
| Emissivity, hemispherical ($E_h$) | less than about 0.20. |

In certain further preferred embodiments of this invention, the $E_n$ before heat-treatment is about 0.14; and wherein the hemispherical emissivity ($E_h$) after the heat-treatment is less than about 0.14 and before the heat-treatment is about 0.17.

This invention will now be described with respect to certain embodiments thereof, along with reference to the accompanying illustrations, wherein:

IN THE DRAWINGS

DETAILED DESCRIPTION OF THE INVENTION

Figure 1:
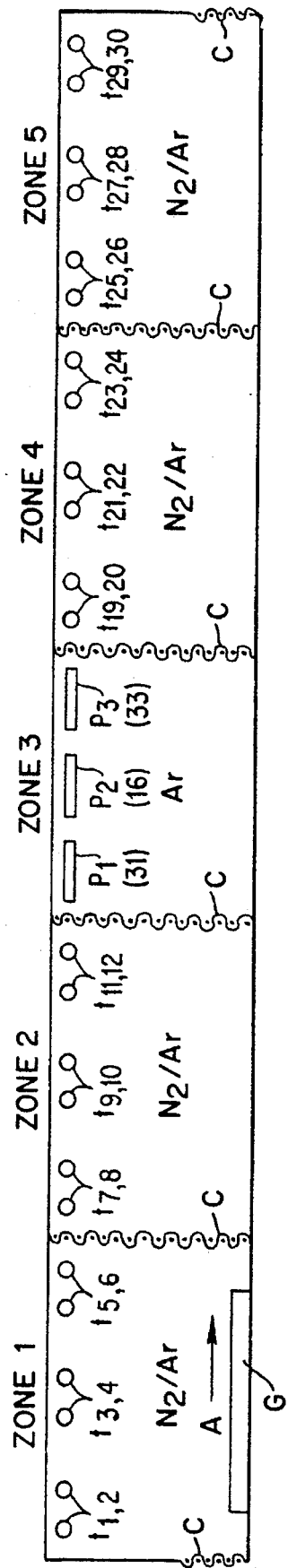
FIG. 1 is a schematic illustration of the Airco apparatus which may be employed in the practice of this invention (and which is employed differently in the practice of the prior art of FIG. 2).

Referring to FIG. 1, there is illustrated a conventional magnetron sputter coater such as the Airco device referenced above. In the practice of this invention five zones, 1–5, are preferably employed although any number (e.g. six) may be used. Coating layers are sequentially applied to the glass G as it progresses in the direction of arrow "A". Zone 1 contains six rotatable tubular targets $t_{1-6}$ preferably of silicon (Si) (e.g. Si doped with about 3–5% by weight Al for conductivity). Zone 2 contains six more tubular targets $t_{7-2}$ of the same Si material. In a similar fashion, Zones 4 and 5 each contain six more tubular targets $t_{19-24}$ and $t_{25-30}$, respectively, of the same Si material. Zones 1, 2, 4, and 5 each preferably utilize three (3) cathodes (not shown) wherein each cathode operates two of the rotatable silicon (Si) targets.

Figure 3:
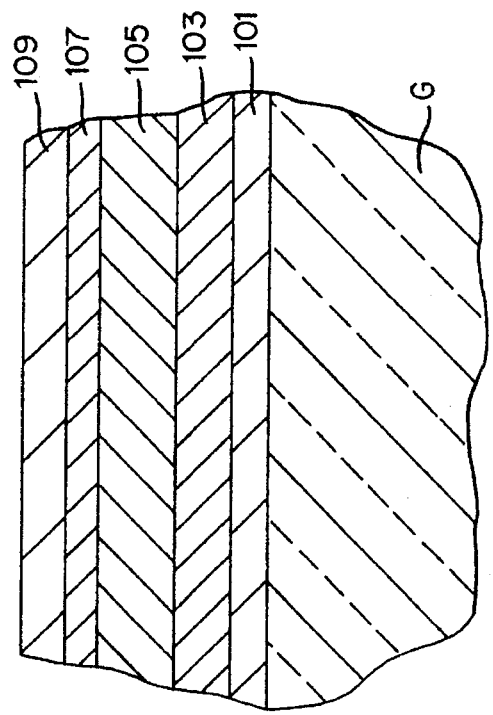
FIG. 3 is a partial side sectional view of an embodiment of this invention.

Middle Zone 3 is formed of either three planar targets $P_{1-3}$ (i.e. numbered 31, 16, and 33, respectively), six rotatable tubular targets, or combinations thereof for making the three central layers of the five-layered coating system shown in FIG. 3. The Zone 3 targets can, of course, also be used to make the three central layers of the prior art Airco layering system illustrated in FIG. 2, the three central layers of the five layered non-heat-treatable coated glass of Ser. No. 07/876,350, and the heat-treatable layers of aforesaid described Ser. No. 08/102,281.

As will be more fully described in the examples set forth below, these three different glasses may all be sequentially produced, one after the other in any order, within the same sputter coater without having to change the targets or shut down the sputter coater, by simply adjusting the power levels and atmospheres in predetermined zones of the sputter coater.

In operation, the Zones 1–5 are separated by appropriate curtains "C" as are the ends, thereby to be able to establish in each zone a given, controlled atmosphere, all by conventional apparatus well known in the sputter coating art.

FIG. 3 illustrates a heat-treatable coated glass of our invention which may be formed using the apparatus of FIG. 1. As illustrated, there are five layers formed on a float glass (about 2 mm–6 mm thick) substrate G. Any type or size of float glass substrate may be used (e.g. clear, green, etc.). For example, the glass substrate G may be clear glass having a thickness of about 2.5 mm–3.5 mm.

First layer 101 is $Si_3N_4$ (silicon nitride) and is formed in Zones 1–2 preferably employing an atmosphere of about 80% $N_2$ and about 20% Ar. Optionally, under certain conditions a substantially 100% $N_2$ (nitrogen) atmosphere may be introduced into Zones 1–2. The pressure in Zones 1–2 is preferably maintained at about 2.0–3.0×10³ Torr (most preferably at about 2.0 microns).

When a clear glass substrate of about 2.5 mm–3.5 mm in thickness is used, the coated glass has a visible transmittance of about 86–90% after Zone 1 and about 81–84% after Zone 2.

Next, metal layers 103, 105, and 107 are formed in Zone 3. Zone 3 preferably utilizes a process gas of substantially 100% argon maintained at a pressure of about 1–2 microns. Optionally, a small amount of $O_2$(e.g. about 5–10%) may be introduced into Zone 3. In this embodiment, planar target $P_1$ (31) is preferably 80/20 nichrome, but may be nickel or other nickel-based alloys as desired.

The thickness of layer 103 formed via target $P_1$ is believed to be an important aspect of certain embodiments of this invention. It has been found that by altering the nickel-chrome undercoat layer 103, in some instances by a factor of about 2–4 (e.g. about 3) over that of the standard prior art Airco coated glass article shown in FIG. 2, as well as over that of the five-layered coated glass described in commonly owned application Ser. No. 07/876,350, the resulting coated glass article can be heat-treated by conventional heat-treating (e.g. tempering, etc.) processes without adversely affecting the uniformity of the glass article and resulting in desired and predetermined solar management properties. In this respect, it has been quite surprisingly found, that in the preferred embodiments of this invention the initial unheat-treated coating optics (color, emissivity, reflectance, transmittance, etc.) are inherently adjusted during heat-treatment so that those same optics after heat-treatment are nearly an exact match with those of the five-layered unheat-treatable coated glass described in commonly owned Ser. No. 07/876,350.

It has been found in this respect that only the lower nickel or nichrome layer 103 need be thickened. Thickening the upper nickel or nichrome layer 107, surprisingly, not result in a heat-treatable product, and thickening both layers, while resulting in heat-treatability, will result in too low a visible transmission for matching the optics of the 876,350 glass.

For this reason then, the lower nickel-based layer 103 is sputter coated to a thickness of greater than about 20 Å (preferably about 30–50 Å and more preferably about 45 Å). This is accomplished conveniently by simply increasing the power to target $P_1$ to an amount about two to three times greater than that used for producing the upper nickel-based layer 107 via target $P_3$ (33). In a similar manner, the lower nickel or nichrome coating layer of this invention can be applied to the glass substrate by simply increasing the power level of target $P_1$ of the sputter coater set up of Ser. No. 07/876,350 by a factor of about 2 to 3. This results in the production of a coated glass article according to this invention which is different than the five-layered coated glass of Ser. No. 07/876,350 because the lower nickel or nichrome layer of this invention is substantially thicker (e.g. about 2–3 times as thick) than that of Ser. No 07/876,350.

Then, after the lower nickel-based layer 103 has been applied via target $P_1$ and a corresponding cathode (not shown), a silver based layer 105 is formed. Planar silver target $P_2$ (16) is used to form this silver layer 105 to a thickness of about 50–120 Å (obviously, rotatable tubular targets may also be used). The silver layer 105 is preferably about 75 Å thick. The silver (Ag) layer of this embodiment is slightly thinner than that of aforesaid-mentioned Ser. No. 07/876,350. Again, only a simple power adjustment is required (the power to target $P_2$ of Ser. No. 07/876,350 is slightly decreased).

Next, another substantially pure metallic 80/20 nichrome (or other nickel-based) layer 107 is formed in the same way as the first nickel or nichrome layer 103 except that layer 107 is substantially thinner than the thickened nickel or nichrome layer 103. Nichrome layer 107 is preferably about 9–15 Å thick, but may be thinner (e.g. about 7 Å). The second nickel or nichrome layer of this invention and that of Ser. No. 07/876,350 are formed in a manner and to a thickness substantially similar to one another.

One preferred embodiment of this invention utilizes a lower or first nichrome layer 103 about 45 Å thick and an upper or second nichrome layer 107 about 15 Å thick. Therefore, the preferred ratio of the thickness of lower nichrome layer 103 to the thickness of upper nichrome layer 107 is about 3:1.

Planar target $P_3$(33) is used in forming the upper nichrome layer 107, with the power to the second nichrome target $P_3$ being about one-half to one-third of that to the first nichrome target $P_1$ and substantially similar to the power to the second nickel or nichrome target $P_3$ of Ser. No. 07/876,350. After exiting Zone 3, the layer stack consists essentially of silicon nitride/nickel-chrome/silver/nickel, chrome and has a visible transmission of about 52–54% when a clear glass substrate about 2.5 mm–3.5 mm thick is used.

The coated glass continues to move into Zone 4 where the process gas may be either substantially 100% nitrogen or more preferably a mixture of nitrogen and argon (e.g. 80% nitrogen and 20% argon). Zones 1, 2, 4 and 5 of this invention are preferably similar to Zones 1, 2, 4 and 5 of the sputter coater setup used in manufacturing the five-layered unheat-treatable coated glass of Ser. No. 07/876,350. As in Zones 1–2, the pressure in Zones 4–5 is preferably maintained at about $2.0–3.0\times10^3$ Torr (preferably at about 2.0 microns).

In Zones 4–5, an upper or overcoat layer 109 of silicon nitride ($Si_3N_4$) is formed in a similar way as was used to form the undercoat silicon nitride layer 101. Overcoat silicon nitride layer 109 is usually somewhat thicker than undercoat silicon nitride layer 101, as discussed in Ser. No. 07/876,350. For example, lower silicon nitride layer 101 is preferably formed having a thickness of about 350–450 Å (most preferably about 375 Å) and upper silicon nitride layer 109 is preferably formed having a thickness of about 450–550 Å (most preferably about 500 Å).

Figure 2:
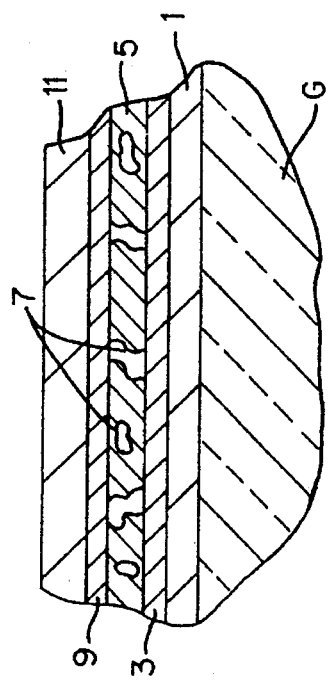
FIG. 2 is a partial side sectional view of the prior art Airco coated glass article layer system.

While at times the thicknesses of the silicon nitride undercoat and overcoat layers 101 and 109 of this invention may be the same as those in the prior art Airco product (see FIG. 2), in the preferred embodiments of this invention, each $Si_3N_4$ layer of this coated glass is thickened in comparison to those of the Airco product shown in FIG. 2, so as to be substantially equivalent to those of the Ser. No. 07/876,350 coated glass. This is accomplished by simply increasing the power in the sputter coater, Zones 1–2 and 4–5, approximately 20% or more to achieve these higher thicknesses. The anti-reflection $Si_3N_4$ layers of Zones 4–5 raise the visible transmission of the glass to about 61–66% and 70–73% respectively.

The resulting layering system has a durability approximately the same as the Airco layer system of FIG. 2, (i.e., it is only slightly less scratch resistant but it passes the durability test). The resulting layering system exhibits markedly superior emissivity, transmittance, heat-treatability, and sheet resistance properties compared to those of the prior art Airco coated glass article illustrated in FIG. 2. It is also chemically resistant.

Before being heat treated, the preferred embodiments of the coated glass of FIG. 3 have a visible transmittance of about 70–73%; a sheet resistance of about 16.0 or less (more preferably about 14.0–14.5 ohms); an $E_n$ of about 0.14–0.16; and an $E_h$ of less than about 0.20 (e.g. about 0.17).

However, after being heat treated (e.g. tempered, bent, heat strengthened, etc.) these preferred embodiments of the coated glasses of FIG. 3 have a visible transmittance of greater than about 76%; a sheet resistance of less than about 12 ohms (preferably less than about 10.5–11.0 ohms); an $E_n$ of less than about 0.12 (preferably about 0.10–0.11); and an $E_h$ of less than about 0.16 (preferably about 0.14 or less).

The heat treatment may be, for example, treatment at 685° C. for about five minutes; a cycled treatment at 665° C. for about sixteen minutes; or treatment in any other conventional tempering furnace.

The $Si_3N_4$ layers of this invention have respective thicknesses which may be adjusted so as to "fine tune" the color control, chemical resistance, scratch resistance, and anti-reflection characteristics of the coated glass article.

It should now be clearly understood from the above description of this invention that the coated glass articles of this invention, of Ser. No. 08/102,281, and of Ser. No. 07/876,350 can be sequentially produced in the same sputter coater by simply adjusting the appropriate power levels and atmospheres of predetermined zones. This, for example, overcomes the problem of having to shut down the sputter coater from production of the unheat-treatable low-E coated glass of Ser. No. 07/876,350 when the need arises for production of: (i) a heat-treatable coated glass which after being heat treated, exhibits optical characteristics which substantially match those of the unheat-treatable coated glass of Ser. No. 07/876,350; or (ii) the heat-treatable coated glass of Ser. No. 08/102,281. By simply increasing the power to target $P_2$ by a factor of about 2–3 and decreasing the power to target $P_2$ by about 5–15% from the sputter coater setup of Ser. No. 07/876,350, or vice versa, while changing the gas mixture in coat Zone 3, the same sputter coater, without shutting down, produces the heat-treatable coated glass article of this invention illustrated in FIG. 3. This process will be more fully described below in Example 1.

The above-described preferred embodiments of this invention allow one to substantially match the optical characteristics of a heat-treated coated glass article to those of an unheat-treated coated glass article. A significant advantage of this invention then is that the heat-treatable coated glass illustrated, for example, in FIG. 3 may be coated and cut before being tempered. This, in turn, allows the manufacturer to stockpile uncut coated heat-treatable glass which has the ability, after being heat-treated, to substantially match the optical characteristics of another, highly advantageous, but unheat-treatable glass such as that of Ser. No. 07/876, 350. Therefore, in practice, with both types of glass in stock and uncut, upon receiving multiple orders from a customer(s) requesting different sizes of a heat-treated (e.g. tempered) glass with optical properties substantially matching those of the nonheat-treatable glass of Ser. No. 07/876,350, also being ordered, the manufacturer need only select for cutting from general inventory unheat-treatable and heat-treatable coated glass of this invention and cut them to their requisite sizes, heat-treat the heat-treatable glass sheets, and deliver the entire order to the customer(s) promptly, and without waiting for special order runs to be made. Heretofore, when only the unheat-treatable, but highly advantageous, coating system of Ser. No. 07/876,350 was available a significant time lag in order fulfillment and inventory problem existed. That is because, of course, when the order required some of the glass to be heat treated (e.g. tempered and/or bent) as well as perhaps cut to sizes different than the unheat treated glass, either huge inventories of various sizes of precut but uncoated glass sheets had to be maintained as the customer had to wait for the glasses to be taken from general inventory (1) pre-cut, (2) some tempered, and (3) all thereafter coated. With the advent of this invention an inventory of coated glass can be maintained of the two different (or more) layer systems. When a mixed order(s) comes in, the customer(s) needs are rapidly filled since the coating step has already taken place.

This invention will now be described with respect to certain examples as follows:

EXAMPLE 1

A typical prior art Airco coated glass article ("STD") exemplified by FIG. 2, a coated glass article of this invention exemplified by FIG. 3, and an unheat-treatable coated glass of Ser. No. 07/876,350 were produced using the sputter coater of FIG. 1. The heat-treatable coated glass of this invention and the unheat-treatable Ser. No. 876,350 coated glass were sequentially produced in the same sputter coater in this example.

The coated glass article of this invention was prepared as follows.

THIS INVENTION

A clear glass substrate G, 3.2 mm thick was conveyed through the Airco sputter coater of FIG. 1 whose zones were separated in a known fashion by curtains/walls. The line speed was 320 in/min. A pre-wash and post-wash (not shown) were conventionally provided. Clear float glass substrate G progressed through Zone 1 in which the process gas was maintained at a pressure of 2.0 microns ($2.0 \times 10^{-3}$ Torr) and was a mixture of 80% nitrogen and 20% argon. All three cathodes (not shown) of Zone 1, each of which had two rotatable silicon targets, were run at a power setting which caused them via their targets ($t_{1-6}$) to deposit a layer of silicon nitride ($Si_3N_4$) at a thickness sufficient to reduce the visible transmission of the glass article to 87.5%.

The glass was then moved through Zone 2 in which the process gas was 80% $N_2$ and 20% Ar, and the pressure was $2.1 \times 10^{-3}$ Torr. The three cathodes of Zone 2, each having two rotatable silicon targets, were run at a power setting which caused them to deposit a second layer of silicon nitride ($Si_3N_4$) on the glass article further reducing the visible transmission of the article to 82.3%.

The glass continued to move into Zone 3 in which the process gas was 100% argon maintained at a pressure of 1.5 microns ($1.5 \times 10^{-3}$ Torr). Three cathodes each with a single planar target ($P_1$–$P_3$) were used with the first ($P_1$) and third ($P_3$) planar targets being an 80–20 nickel-chrome alloy and the second ($P_2$) being a silver target. The power to the first nickel-chrome target ($P_1$) was at a setting of 3.57 kW. The power to the silver target was 7.1 kW which was sufficient to produce a layer of silver on the coated glass with a sheet resistance ($R_s$) of about 14 ohms per square as measured with a conventional four point probe. The power to the third nickel chrome target ($P_3$) was 1.33 kW. The layer stack, now consisting of silicon nitride ($Si_3N_4$)/nickel-chrome/silver/ nickel-chrome, had a visible transmission of 53.0%.

The glass continued to move into Zone 4 where the process gas was 80% $N_2$ and 20% Ar, and the pressure was $2.1 \times 10^{-3}$ Torr. Three cathodes, each having two rotatable silicon targets were run at a power setting which caused them to deposit a layer of silicon nitride ($Si_3N_4$) which, being an anti-reflective layer, raised the visible transmission of the glass article to 64.5%.

The glass then moved into Zone 5 where the process gas was 80% $N_2$ and 20% Ar, and the pressure was $2.1 \times 10^{-3}$ Torr. Three cathodes, each having two rotatable silicon targets, were run at a power setting which caused them to deposit a final layer of silicon nitride on the glass substrate. This anti-reflection layer raised the visible transmission of the glass article to 71.09%. This then completes the coating layer system of this example.

The resulting layering system of this invention consisted essentially from the clear glass substrate outward of a $Si_3N_4$ layer about 375 Å thick, a NiCr layer about 45 Å thick, a silver layer about 75 Å thick, a second NiCr layer about 15 Å, and finally a second $Si_3N_4$ layer about 450 Å thick.

This coated glass article was then heat-treated at 665° C. (1229° F.) for a 16 minute ramp cycle.

The power, pressure and target parameters were as follows:

TABLE 1

(Process Conditions for this Invention of Example 1)
(Line Speed = 320 in/min.)

| Zone | Cathode | Target | KW | Cathode Volts | Amps | Pressure | Process Gas Weight Ratio |
|---|---|---|---|---|---|---|---|
| 1 | 1 | $t_1$ | 40.1 | 452 | 81.4 | $2.0 \times 10^{-3}$ Torr. | 80% $N_2$/20% Ar |
|   | 1 | $t_2$ | 38.3 | 425 | 83.0 | $2.0 \times 10^{-3}$ Torr. | 80% $N_2$/20% Ar |
|   | 2 | $t_3$ | 39.3 | 432 | 82.1 | $2.0 \times 10^{-3}$ Torr. | 80% $N_2$/20% Ar |
|   | 2 | $t_4$ | 37.9 | 417 | 81.1 | $2.0 \times 10^{-3}$ Torr. | 80% $N_2$/20% Ar |
|   | 3 | $t_5$ | x | x | x | $2.0 \times 10^{-3}$ Torr. | 80% $N_2$/20% Ar |
|   | 3 | $t_6$ | x | x | x | $2.0 \times 10^{-3}$ Torr. | 80% $N_2$/20% Ar |
| 2 | 4 | $t_7$ | 32.0 | 443 | 66.5 | $2.1 \times 10^{-3}$ Torr. | 80% $N_2$/20% Ar |
|   | 4 | $t_8$ | 28.3 | 428 | 59.1 | $2.1 \times 10^{-3}$ Torr. | 80% $N_2$/20% Ar |
|   | 5 | $t_9$ | 37.0 | 432 | 78.9 | $2.1 \times 10^{-3}$ Torr. | 80% $N_2$/20% Ar |
|   | 5 | $t_{10}$ | 35.7 | 433 | 76.1 | $2.1 \times 10^{-3}$ Torr. | 80% $N_2$/20% Ar |
|   | 6 | $t_{11}$ | x | x | x | $2.1 \times 10^{-3}$ Torr. | 80% $N_2$/20% Ar |
|   | 6 | $t_{12}$ | x | x | x | $2.1 \times 10^{-3}$ Torr. | 80% $N_2$/20% Ar |
| 3 | 7 | $P_1$ (31) | 3.57 | 405 | 8.97 | $1.5 \times 10^{-3}$ Torr. | 100% Ar |
|   | 8 | $P_2$ (16) | 7.10 | 438 | 17.4 | $1.5 \times 10^{-3}$ Torr. | 100% Ar |
|   | 9 | $P_3$ (33) | 1.33 | 359 | 3.78 | $1.5 \times 10^{-3}$ Torr. | 100% Ar |
| 4 | 10 | $t_{19}$ | 41.8 | 437 | 84.0 | $2.1 \times 10^{-3}$ Torr. | 80% $N_2$/20% Ar |
|   | 10 | $t_{20}$ | 38.0 | 432 | 81.6 | $2.1 \times 10^{-3}$ Torr. | 80% $N_2$/20% Ar |
|   | 11 | $t_{21}$ | 14.5 | 435 | 31.2 | $2.1 \times 10^{-3}$ Torr. | 80% $N_2$/20% Ar |
|   | 11 | $t_{22}$ | 36.9 | 417 | 81.3 | $2.1 \times 10^{-3}$ Torr. | 80% $N_2$/20% Ar |
|   | 12 | $t_{23}$ | 39.5 | 436 | 85.9 | $2.1 \times 10^{-3}$ Torr. | 80% $N_2$/20% Ar |
|   | 12 | $t_{24}$ | 41.0 | 410 | 86.3 | $2.1 \times 10^{-3}$ Torr. | 80% $N_2$/20% Ar |
| 5 | 13 | $t_{25}$ | 40.2 | 438 | 83.8 | $2.1 \times 10^{-3}$ Torr. | 80% $N_2$/20% Ar |
|   | 13 | $t_{26}$ | 39.2 | 435 | 82.0 | $2.1 \times 10^{-3}$ Torr. | 80% $N_2$/20% Ar |
|   | 14 | $t_{27}$ | 15.8 | 436 | 31.7 | $2.1 \times 1^{-3}$ Torr. | 80% $N_2$/20% Ar |
|   | 14 | $t_{28}$ | 36.9 | 420 | 81.0 | $2.1 \times 10^{-3}$ Torr | 80% $N_2$/20% Ar |
|   | 15 | $t_{29}$ | 39.8 | 439 | 85.8 | $2.1 \times 10^{-3}$ Torr. | 80% $N_2$/20% Ar |
|   | 15 | $t_{30}$ | 41.3 | 444 | 86.4 | $2.1 \times 10^{-3}$ Torr. | 80% $N_2$/20% Ar |

PRODUCTION OF UNHEAT-TREATABLE COATED GLASS OF Ser. No. 07/876,350

The power levels to targets $p_1$–$p_3$ and the Zone 3 atmosphere were then adjusted and the five layered unheat-treatable coated glass of Ser. No. 07/876,350 was then produced as follows on a 3.2 mm thick clear float glass substrate.

The visible transmission of the Ser. No. 876,350 glass after Zones 1 and 2 was 87.5% and 82.3% respectively following the sputter coating of the metal layers in Zone 3, the transmission of the glass was 56.1% (versus 53.0% for the coated glass of this invention). Following Zones 4 and 5, the visible transmission of the glass was 69.3% and 77.2% respectively.

The process conditions for the production of the Ser. No. 07/876,350 glass were as follows.

TABLE 2

(Process Conditions for five layered unheat-treatable coated glass of 07/876, 350)
(Line Speed = 320 in/min.)

| Zone | Cathode | Target | KW | Cathode Volts | Amps | Pressure | Process Gas Weight Ratio |
|---|---|---|---|---|---|---|---|
| 1 | 1 | $t_1$ | 40.1 | 452 | 81.4 | $2.0 \times 10^{-3}$ Torr. | 80% $N_2$/20% Ar |
|   | 1 | $t_2$ | 38.3 | 425 | 83.0 | $2.0 \times 10^{-3}$ Torr. | 80% $N_2$/20% Ar |
|   | 2 | $t_3$ | 39.3 | 432 | 82.1 | $2.0 \times 10^{-3}$ Torr. | 80% $N_2$/20% Ar |
|   | 2 | $t_4$ | 37.9 | 417 | 81.1 | $2.0 \times 10^{-3}$ Torr. | 80% $N_2$/20% Ar |
|   | 3 | $t_5$ | x | x | x | $2.0 \times 10^{-3}$ Torr. | 80% $N_2$/20% Ar |
|   | 3 | $t_6$ | x | x | x | $2.0 \times 10^{-3}$ Torr. | 80% $N_2$/20% Ar |
| 2 | 4 | $t_7$ | 32.0 | 443 | 66.5 | $2.1 \times 10^{-3}$ Torr. | 80% $N_2$/20% Ar |
|   | 4 | $t_8$ | 28.3 | 428 | 59.1 | $2.1 \times 10^{-3}$ Torr. | 80% $N_2$/20% Ar |
|   | 5 | $t_9$ | 37.0 | 432 | 78.9 | $2.1 \times 10^{-3}$ Torr. | 80% $N_2$/20% Ar |
|   | 5 | $t_{10}$ | 35.7 | 433 | 76.1 | $2.1 \times 10^{-3}$ Torr. | 80% $N_2$/20% Ar |
|   | 6 | $t_{11}$ | x | x | x | $2.1 \times 10^{-3}$ Torr. | 80% $N_2$/20% Ar |
|   | 6 | $t_{12}$ | x | x | x | $2.1 \times 10^{-3}$ Torr. | 80% $N_2$/20% Ar |
| 3 | 7 | $P_1$ (31) | 2.96 | 406 | 7.44 | $1.5 \times 10^{-3}$ Torr. | 50% $N_2$/50% Ar |
|   | 8 | $P_2$ (16) | 12.3 | 474 | 26.3 | $1.5 \times 10^{-3}$ Torr. | 50% $N_2$/50% Ar |
|   | 9 | $P_3$ (33) | 1.79 | 375 | 4.87 | $1.5 \times 10^{-3}$ Torr. | 50% $N_2$/50% Ar |

TABLE 2-continued (Process Conditions for five layered unheat-treatable coated glass of 07/876, 350)
(Line Speed = 320 in/min.)

| Zone | Cathode | Target | KW | Cathode Volts | Amps | Pressure | Process Gas Weight Ratio |
|---|---|---|---|---|---|---|---|
| 4 | 10 | $t_{19}$ | 41.8 | 437 | 84.0 | $2.1 \times 10^{-3}$ Torr. | 80% $N_2$/20% Ar |
|   | 10 | $t_{20}$ | 38.0 | 432 | 81.6 | $2.1 \times 10^{-3}$ Torr. | 80% $N_2$/20% Ar |
|   | 11 | $t_{21}$ | 14.5 | 435 | 31.2 | $2.1 \times 10^{-3}$ Torr. | 80% $N_2$/20% Ar |
|   | 11 | $t_{22}$ | 36.9 | 417 | 81.3 | $2.1 \times 10^{-3}$ Torr. | 80% $N_2$/20% Ar |
|   | 12 | $t_{23}$ | 39.5 | 436 | 85.9 | $2.1 \times 10^{-3}$ Torr. | 80% $N_2$/20% Ar |
|   | 12 | $t_{24}$ | 41.0 | 410 | 86.3 | $2.1 \times 10^{-3}$ Torr. | 80% $N_2$/20% Ar |
| 5 | 13 | $t_{25}$ | 40.2 | 438 | 83.8 | $2.1 \times 10^{-3}$ Torr. | 80% $N_2$/20% Ar |
|   | 13 | $t_{26}$ | 39.2 | 435 | 82.0 | $2.1 \times 10^{-3}$ Torr. | 80% $N_2$/20% Ar |
|   | 14 | $t_{27}$ | 15.8 | 436 | 31.7 | $2.1 \times 10^{-3}$ Torr. | 80% $N_2$/20% Ar |
|   | 14 | $t_{28}$ | 36.9 | 420 | 81.0 | $2.1 \times 10^{-3}$ Torr. | 80% $N_2$/20% Ar |
|   | 15 | $t_{29}$ | 39.8 | 439 | 85.8 | $2.1 \times 10^{-3}$ Torr. | 80% $N_2$/20% Ar |
|   | 15 | $t_{30}$ | 41.3 | 444 | 86.4 | $2.1 \times 10^{-3}$ Torr. | 80% $N_2$/20% Ar |

As can been seen from Tables 1 and 2 above, the unheat-treatable coated glass of Ser. No. 07/876,350 and the heat-treatable coated glass of this invention can be manufactured sequentially one after the other, in the same sputter coater by simply adjusting the power and gas parameters in Zone 3. The targets need not be changed and Zones 1, 2, 4 and 5 may be left unaltered.

Alternatively, the power to targets $P_1$ and $P_3$ may each be adjusted to 2.30 kW in producing the Ser. No. 07/876,350 coated glass, so as to make both the lower and upper Ni:Cr layers about 7 Å thick.

The heat-treatable coated glass of Ser. No. 08/102,281, because of its layering system of $Si_3N_4$, nichrome, etc., may also be sequentially produced by the sputter coater described above, simply by adjusting appropriate power levels and atmosphere(s) of the sputter coater. For example, the power to target $P_2$ could be shut off and a 95% Ar/5% $O_2$ atmosphere at $1.5 \times 10^{-3}$ Torr. could be provided in Zone 3. Then, the heat-treatable coated glass of Ser. No. 08/102,281 consisting essentially of a layering system from the substrate outward of $Si_3N_4$/Ni:Cr/$Si_3N_4$ could be produced by the adjusted sputter coater with appropriate power level adjustments.

PRIOR ART ("STD") FORMATION

The prior art ("STD") Airco glass article of FIG. 2 was formed as follows.

In forming the "STD" prior art coated glass article, the targets ($t_{1-12}$ and $t_{19-30}$) in Zones 1, 2, 4, and 5 were Airco tubular aluminum doped silicon (Si) targets ($t_{1-12}$ and $t_{19-30}$). Targets $P_1$ (31) and $P_3$ (33) were planar targets and were by weight $_{80}$% Ni and $_{20}$% Cr. Target $P_2$ (16) was also planar but was silver (Ag). The clear float glass substrate G employed was a conventional soda-lime-silica float glass produced by Guardian Industries Corp. having a thickness of 3 mm. The line speed used was 345 inches/min. The pressure in Zones 1–2 and 4–5 was maintained at $2.5 \times 10^{-3}$ Torr. A 100% $N_2$ atmosphere was employed in these zones. In Zone 3 a pressure of $2.0 \times 10^{-3}$ Torr was maintained and a 100% argon (Ar) atmosphere was employed.

The resulting coated glass article had a layering system consisting essentially of from the substrate G outward: a $Si_3N_4$ undercoat layer about 325 Å thick; a first NiCr (nichrome) layer about 7 Å thick; a silver layer about 70 Å thick; a second NiCr layer about 7 Å thick; and an overcoat $Si_3N_4$ layer about 450 Å thick. The electrical supply for each target was as follows:

TABLE 3

("STD" ZONES 1–5)

| Zone | Target No. (t) | Amps (A) | Power (KW) |
|---|---|---|---|
| 1 | 1 | 80 | |
|   | 2 | 80 | |
|   | 3 | 80 | |
|   | 4 | 80 | |
|   | 5 | 80 | |
|   | 6 | 80 | |
| 2 | 7 | 80 | |
|   | 8 | 80 | |
|   | 9 | 80 | |
|   | 10 | 80 | |
|   | 11 | 80 | |
|   | 12 | 80 | |
| 3 | 31 | 3.8 | 1.5 |
|   | 16 | 18.4 | 8.1 |
|   | 33 | 3.8 | 1.5 |
| 4 | 19 | 135 | |
|   | 20 | 105 | |
|   | 21 | 125 | |
|   | 22 | 125 | |
|   | 23 | 105 | |
|   | 24 | 25 | |
| 5 | 25 | 125 | |
|   | 26 | 120 | |
|   | 27 | 50 | |
|   | 28 | 110 | |
|   | 29 | 110 | |
|   | 30 | 80 | |

TABLE 4

(Comparative Results)

| Layer System | Sheet Resistance ($R_s$) (ohms/sq.) | Emissivity (normal) $E_n$ |
|---|---|---|
| This invention (Example 1) (before heat-treatment) | 14.4 | 0.15 |
| This invention (Example 1) (after heat-treatment at about 1229° F. for a 16 min. ramp cycle) | 10.5 | 0.11 |
| "STD" (no heat-treatment) | 15.8 | 0.16 |

TABLE 5

(Comparative Results)

| Layer System | Visible Transmittance | Glass Side ($R_G$) Reflectance | Film Side ($R_F$) Reflectance |
|---|---|---|---|
| This invention (Example 1) (before heat treatment) (Ill. C 10° obs.) | Y = 71.09% | Y = 9.68%<br>$a_h$ = −2.67<br>$b_h$ = −6.77 | Y = 3.37%<br>$a_h$ = 0.70<br>$b_h$ = −7.45 |
| This invention (Example 1) (after heat treatment) (Ill. C 10° obs.) | Y = 76.08% | Y = 8.60%<br>$a_h$ = −2.19<br>$b_h$ = −8.09 | Y = 3.84%<br>$a_h$ = −0.74<br>$b_h$ = −9.31 |
| "STD" (no heat treatment) (Ill. C 10° obs.) | Y = 76.45% | Y = 8.26%<br>$a_h$ = −3.25<br>$b_h$ = −9.88 | Y = 5.09%<br>$a_h$ = −1.76<br>$b_h$ = −6.95 |
| 07/876, 350 (Ex.1) (unheat-treatable) (Ill. C 10° obs.) | Y = 76.5% | Y = 8.65%<br>$a_h$ = −1.80<br>$b_h$ = −8.0 | Y = 3.80%<br>$a_h$ = 0.50<br>$b_h$ = −11.0 |

Tables 4 and 5 as set forth above illustrate the comparative results of the coated glass article of this invention versus both the "STD" coated glass article of the prior art Airco product shown in FIG. 2 and the Ser. No. 07/876,350 unheat-treatable low-E coated glass. As can be seen in Table 4, the heat-treatable coated glass article of this invention, after heat treatment, has an $E_n$ and a $R_s$ significantly lower than that of the prior art "STD" glass. It should be remembered that the "STD" glass is unheat-treatable. Table 5 illustrates the remarkedly different optical characteristics of the "STD" glass and the coated glass article of this invention. The reflectances Y, and reflected colors "$a_h$" and "$b_h$", sheet resistance $R_s$ and emissivity $E_n$ of the coated glass article of this invention after heat-treatment are surprisingly similar to and substantially match those of the five-layered coated glass of Ser. No. 07/876,350 as can be seen in Table 5.

EXAMPLE 2

This example discloses another formation of a heat-treatable coated glass article according to this invention, as follows.

A clear glass substrate G 3.2 mm thick was conveyed on a conveyor through the Airco sputter coater of FIG. 1 at a line speed of 320 in/min. and whose zones were separated by curtains/walls in the conventional fashion. Substrate G progressed through Zone 1 in which the process gas was maintained at a pressure of $2.0 \times 10^{-3}$ Torr. and was a mixture of 80% $N_2$ and 20% Ar. All three cathodes (not shown) of Zone 1 were run at a power setting as indicated in the chart below. Each cathode had two rotatable silicon targets.

The glass was then moved through Zone 2 where the process gas was a mixture of 80% $N_2$ and 20% Ar, but was maintained at a pressure of $1.5 \times 10^{-3}$ Torr.

The glass continued into Zone 3 in which the process gas was a mixture of 100% Ar and was maintained at a pressure of $1.5 \times 10^{-3}$ Torr. Three planar targets ($P_{1-P3}$) were used in Zone 3 with the first and third ($P_1$ and $P_3$) being an 80–20 nickel-chrome alloy (nichrome) and the second ($P_2$) being a silver (Ag) target.

The glass then moved into Zones 4–5 which each utilized six rotatable Si targets and three corresponding cathodes. The process gas of both Zone 4 and Zone 5 was 80% $N_2$ and 20% Ar and was maintained at pressures of $2.0 \times^{-3}$ Torr. and $2.1 \times 10^{-3}$ Torr. respectively. The $Si_3N_4$ layer of Zone 1 was sputter coated to a thickness sufficient to reduce the visible transmission of the glass to 89.0%. The Zone 2 $Si_3N_4$ layer reduced the visible transmission of the glass to 82.1%, while the Zone 3 metal layers reduced the visible transmission to 53.8%. The $Si_3N_4$ layers of Zones 4 and 5 raised the visible transmission to 62.0% and 72.2% respectively. The process conditions for Zones 1–5 of this example are listed below in Table 6.

TABLE 6

(Process Conditions for Example 2)

| Zone | Cathode | Target | KW | Cathode Volts | Amps | Pressure | Process Gas Weight Ratio |
|---|---|---|---|---|---|---|---|
| 1 | 1 | $t_1$ | 28.4 | 388 | 66.1 | $2.0 \times 10^{-3}$ Torr. | 80% $N_2$/20% Ar |
|  | 1 | $t_2$ | 27.3 | 401 | 63.8 | $2.0 \times 10^{-3}$ Torr. | 80% $N_2$/20% Ar |
|  | 2 | $t_3$ | 30.7 | 414 | 66.3 | $2.0 \times 10^{-3}$ Torr. | 80% $N_2$/20% Ar |
|  | 2 | $t_4$ | 28.7 | 400 | 65.1 | $2.0 \times 10^{-3}$ Torr. | 80% $N_2$/20% Ar |
|  | 3 | $t_5$ | 29.7 | 417 | 65 | $2.0 \times 10^{-3}$ Torr. | 80% $N_2$/20% Ar |
|  | 3 | $t_6$ | 32.0 | 428 | 66.5 | $2.0 \times 10^{-3}$ Torr. | 80% $N_2$/20% Ar |
| 2 | 4 | $t_7$ | 28.3 | 406 | 63.2 | $1.5 \times 10^{-3}$ Torr. | 80% $N_2$/20% Ar |
|  | 4 | $t_8$ | 32.5 | 452 | 67.8 | $1.5 \times 10^{-3}$ Torr. | 80% $N_2$/20% Ar |
|  | 5 | $t_9$ | 27.9 | 399 | 63.9 | $1.5 \times 10^{-3}$ Torr. | 80% $N_2$/20% Ar |
|  | 5 | $t_{10}$ | 29.8 | 420 | 63.6 | $1.5 \times 10^{-3}$ Torr. | 80% $N_2$/20% Ar |
|  | 6 | $t_{11}$ | x | x | x | $1.5 \times 10^{-3}$ Torr. | 80% $N_2$/20% Ar |
|  | 6 | $t_{12}$ | x | x | x | $1.5 \times 10^{-3}$ Torr. | 80% $N_2$/20% Ar |
| 3 | 7 | $P_1$ (31) | 3.57 | 402 | 9.06 | $1.5 \times 10^{-3}$ Torr. | 100% Ar |
|  | 8 | $P_2$ (16) | 7.6 | 392 | 20.5 | $1.5 \times 10^{-3}$ Torr. | 100% Ar |
|  | 9 | $P_3$ (33) | 1.33 | 363 | 3.75 | $1.5 \times 10^{-3}$ Torr. | 100% Ar |
| 4 | 10 | $t_{19}$ | 37.3 | 436 | 80.0 | $2.0 \times 10^{-3}$ Torr. | 80% $N_2$/20% Ar |
|  | 10 | $t_{20}$ | x | x | x | $2.0 \times 10^{-3}$ Torr. | 80% $N_2$/20% Ar |
|  | 11 | $t_{21}$ | 34.4 | 431 | 78.8 | $2.0 \times 10^{-3}$ Torr. | 80% $N_2$/20% Ar |
|  | 11 | $t_{22}$ | 36.4 | 460 | 78.7 | $2.0 \times 10^{-3}$ Torr. | 80% $N_2$/20% Ar |
|  | 12 | $t_{23}$ | 37.8 | 457 | 79.2 | $2.0 \times 10^{-3}$ Torr. | 80% $N_2$/20% Ar |
|  | 12 | $t_{24}$ | 37.1 | 438 | 80 | $2.0 \times 10^{-3}$ Torr. | 80% $N_2$/20% Ar |
| 5 | 13 | $t_{25}$ | 38.3 | 433 | 79.1 | $2.1 \times 10^{-3}$ Torr. | 80% $N_2$/20% Ar |
|  | 13 | $t_{26}$ | 36.5 | 425 | 77 | $2.1 \times 10^{-3}$ Torr. | 80% $N_2$/20% Ar |
|  | 14 | $t_{27}$ | 35.1 | 419 | 75.4 | $2.1 \times 10^{-3}$ Torr. | 80% $N_2$/20% Ar |

TABLE 6-continued (Process Conditions for Example 2)

| Zone | Cathode | Target | KW | Cathode Volts | Amps | Pressure | Process Gas Weight Ratio |
|---|---|---|---|---|---|---|---|
| | 14 | $t_{28}$ | 36.0 | 433 | 76.5 | $2.1 \times 10^{-3}$ Torr. | 80% $N_2$/20% Ar |
| | 15 | $t_{29}$ | 34.7 | 431 | 76.4 | $2.1 \times 10^{-3}$ Torr. | 80% $N_2$/20% Ar |
| | 15 | $t_{30}$ | 37.5 | 446 | 76.8 | $2.1 \times 10^{-3}$ Torr. | 80% $N_2$/20% Ar |

After heat-treatment at 1229° F. for a 16 minute ramp cycle, the coated glass article of Example 2 had a visible transmittance (Ill. C 10° obs.) of 77.7%; and a sheet resistance ($R_s$) of 10.3 ohms/sq. Likewise, after heat treatment the glass of this example had the following optical characteristics:

| Glass side Reflectance ($R_G$) | Film side Reflectance ($R_f$) |
|---|---|
| Y = 7.49% | Y = 3.41% |
| $a_h$ = −1.57 | $a_h$ = 0.28 |
| $b_h$ = −8.94 | $b_h$ = −9.16 |

The coated glass articles of this invention are also "durable" and "chemically resistant". The chemical resistance of the product formed according to this invention in Examples 1 and 2 set forth above was tested by boiling a 2"×5" sample of the article in about 500 cc of 5% HCl for one hour (i.e. about 220° F.). The article is deemed "to pass" this test if it shows no pinholes greater than about 0.003" in diameter after this one hour boil. The coated glass articles formed according to this invention in Examples 1 and 2 "passed" this chemical resistance test both before and after heat-treatment at each of a) 685° C. (1265° F.) for five minutes; b) 665° C. (1229° F.) for a ramp cycle of 16 minutes; and c) heat-treatment in a standard tempering furnace.

The "durability" of the coated glass of this invention of Examples 1 and 2 was tested before and after heat-treatment by a conventional Taber abrader test with a 4"×4" sample of the product and a 500 gm. weight attached to each of two C.S. 10F abrasion wheels rotated through 100 revolutions. If no substantial, noticeable scratches appear when viewed with the naked eye under visible light, the test is deemed "passed", and the article is said to be durable. The coated glass articles of Examples 1 and 2 "passed" this durability test both before and after heat-treatment.

It can be seen from the two examples given above, that by simply thickening (about threefold) the lower nickel based (or nichrome) layer of the Airco FIG. 2 prior art coated glass (or the lower nickel or nichrome layer of Ser. No. 07/876,350), one ends up with a coated glass article which is both heat-treatable, and "low-E" ($E_n$ <0.12) after being heat-treated. Another unexpected consequence of thickening the lower nickel (or nichrome) layer is that after being heat-treated, the resulting coated glass article has desired optical characteristics which substantially match those of the "low-E" unheat-treatable coated glass article of Ser. No. 07/876,350 which has a different layering system than that of the heat-treated glass.

The layering system of the above-described "low-E" glass article of Ser. No. 07/876,350 is remarkably similar to the layering system of the present invention except for the thickened lower Ni-based layer and the slightly thinned silver layer of this invention. Thus, one aspect of the instant invention is that by thickening at least one layer of an unheat-treatable "low-E" coated glass article (thereby creating a "different" layer system and glass article as defined herein), one can create a coated glass article which: a) is heat-treatable (e.g. tempered, bent, heat strengthened, etc.); and b) has optical characteristics (e.g. color, $E_n$, etc.) which, after being heat-treated, substantially match those of the original non-heat-treatable "low-E" coated glass article.

The above-described aspect of this invention may be applied to different "low-E" glasses. For example, the seven layered unheat-treatable low-E glass of Ser. No. 07/876,350 is also subject to being matched in accordance with this invention. For example, when the first sputter coated nickel-based layer of this seven layer system is thickened according to the teachings of this invention thereby to create a "different" layer system and glass article; the result is a heat-treatable coated glass article which, after being heat-treated, has optical characteristics which substantially match those of the unheat-treatable seven layer "low-E" coated glass article.

Once given the above disclosure many other features, modifications, and improvements will become apparent to the skilled artisan. Such other features, modifications, and improvements are therefore considered to be a part of this invention, the scope of which is to be determined by the following claims.

We claim:

1. A method of forming a heat-treated thin, durable, solar management layering system onto a glass substrate from the glass outwardly, the steps including:

a) sputter coating in a nitrogen-containing atmosphere an undercoat layer of $Si_3N_4$;

b) sputter coating in an inert gas-containing atmosphere a first layer of nickel or nichrome, said first nickel or nichrome layer having a thickness greater than about 20 Å thick;

c) sputter coating in an inert gas-containing atmosphere a layer of silver;

d) sputter coating in an inert gas-containing atmosphere a second layer of nickel or nichrome, said second layer of nickel or nichrome being about 7–15 Å thick;

e) sputter coating in a nitrogen containing atmosphere an overcoat layer of $Si_3N_4$; and thereafter heat-treating said coated glass wherein said heat-treating is selected from tempering, bending or heat treating; and wherein said heat-treated, sputter coated glass has the following characteristics after said heat-treatment when said glass substrate is clear glass and has a thickness of about 2.5–3.5 mm:

Transmittance (Ill. C. 10° obs.) about 76%–78%
   Sheet Resistance ($R_s$) less than about 12 ohms/sq
   Emissivity, normal ($E_n$) less than about 0.12
   Emissivity, hemispherical ($E_h$) less than about 0.16.

2. The method according to claim 1 wherein said thickness of said first nickel or nichrome layer is about 30–50 Å.

3. The method according to claim 1 wherein said heat-treating step comprises tempering the coated glass by heating it to a temperature of about 1150° F.–1450° F. and thereafter quenching it, the heating and quenching steps being for a sufficient period of time to temper said glass.

4. The method according to claim 1 wherein the coated glass is heated at a temperature and for a sufficient period of time to render said glass article bendable, and thereafter bending said glass to a desired shape while in its bendable condition.

5. The method according to claim 1 wherein said sputter coating is carried out in a plurality of zones isolated from one another and wherein the steps of forming the undercoat and overcoat layers of $Si_3N_4$ by sputter coating are carried out in at least two separate zones, each having an atmosphere consisting essentially of about 80% $N_2$ and about 20% Ar, and wherein the steps of forming the nickel or nichrome layers and the silver layer are carried out in the same zone and wherein said sputter coating is conducted in said same zone in an atmosphere consisting essentially of one of: a) substantially 100% Ar; and b) about 95% Ar and about 5% $O_2$.

6. The method according to claim 1 wherein said undercoat $Si_3N_4$ layer is about 350–450 Å thick and said overcoat $Si_3N_4$ layer is about 450–550 Å thick.

7. The method according to claim 6 wherein said undercoat $Si_3N_4$ layer is sputter coated to a thickness of about 375 Å and said overcoat $Si_3N_4$ layer is sputter coated to a thickness of about 500 Å.

8. The method according to claim 2 wherein there is only a single silver layer, said silver layer having a thickness of about 50–120 Å and wherein said first layer of nickel or nichrome has a thickness of about three times the thickness of said second nickel or nichrome layer.

9. The method according to claim 2 wherein said thickness of said first nickel or nichrome layer is about 45 Å.

10. The method according to claim 1 wherein the coated glass, after said heat-treatment, has a sheet resistance ($R_s$) of about 11 ohms/sq. or less and a normal emissivity ($E_n$) of about 0.11 or less.

\* \* \* \* \*